Feb. 19, 1946. J. M. CAGE 2,395,099
INVISIBLE RAY VISION SYSTEM
Filed July 6, 1935 5 Sheets-Sheet 1
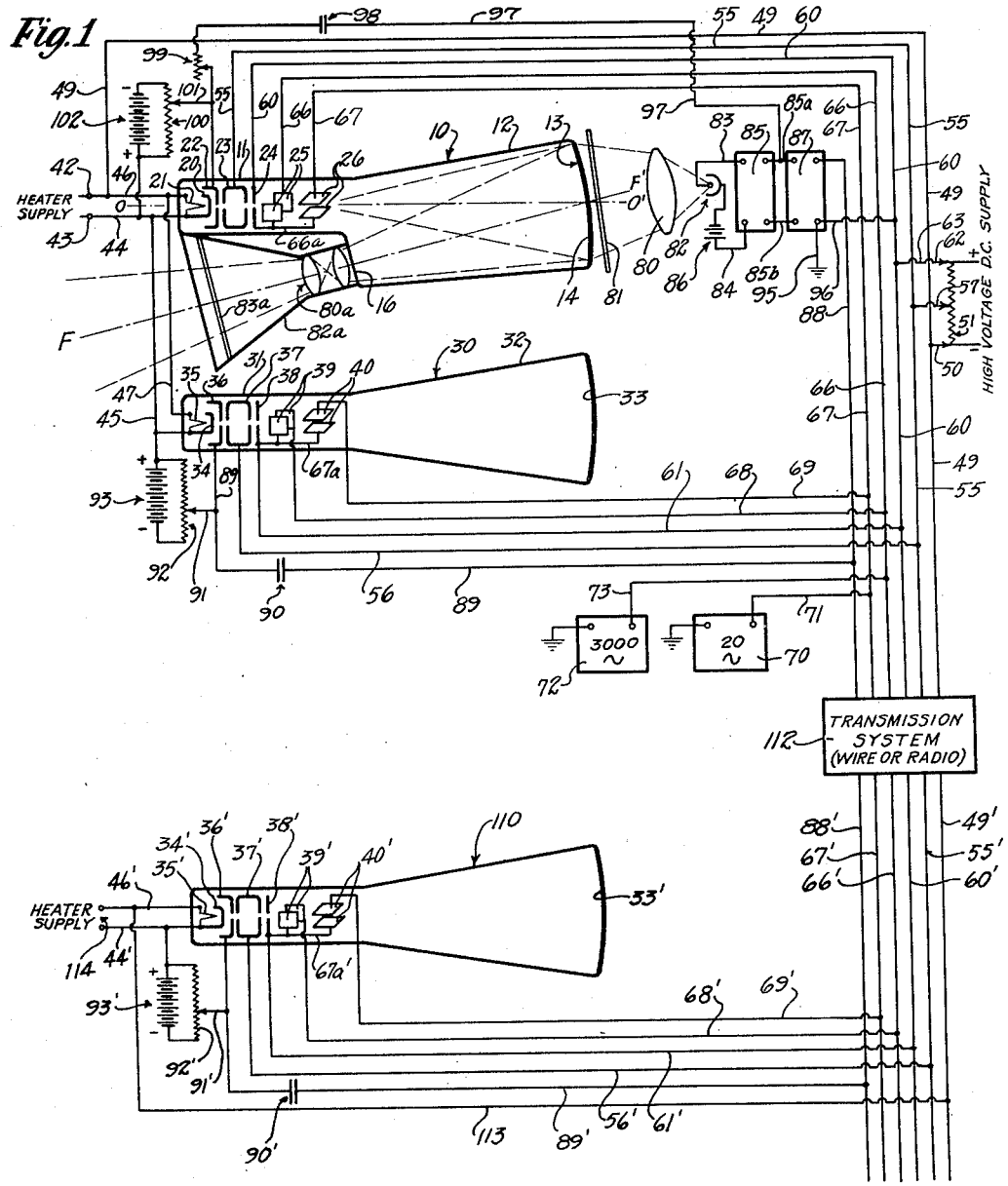
Fig.1
Inventor
John M. Cage.
Attorney.

Inventor
John M. Cage.

Attorney

Inventor
John M. Cage.

Attorney.

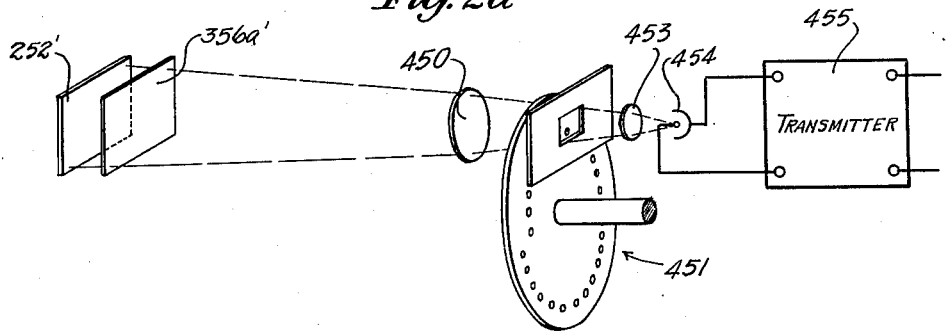
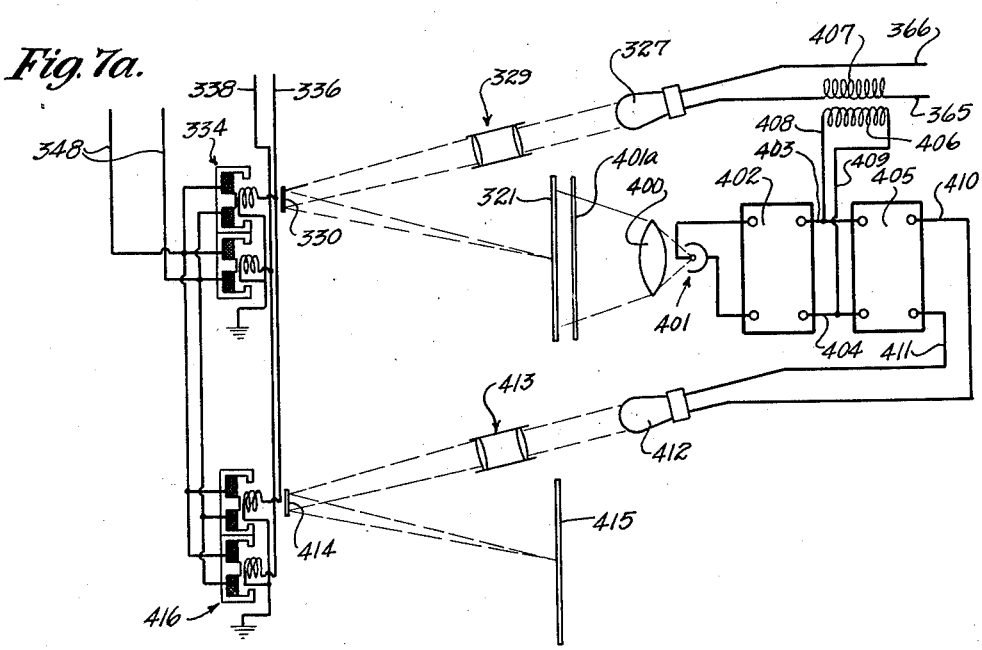
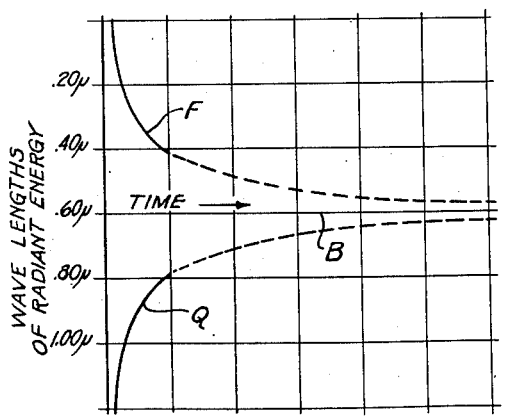

Feb. 19, 1946.            J. M. CAGE            2,395,099
                   INVISIBLE RAY VISION SYSTEM
                     Filed July 6, 1935            5 Sheets-Sheet 5
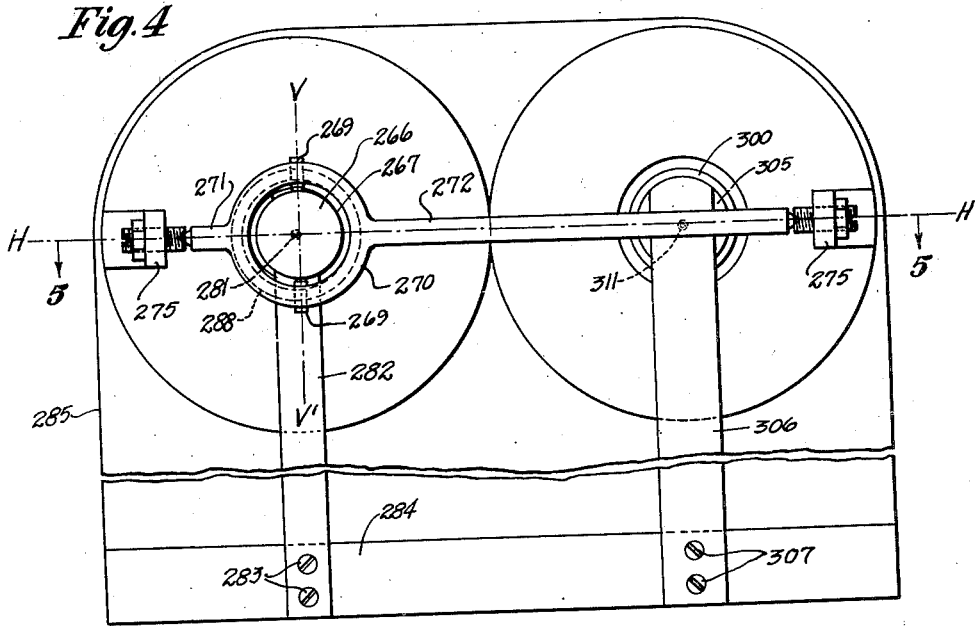
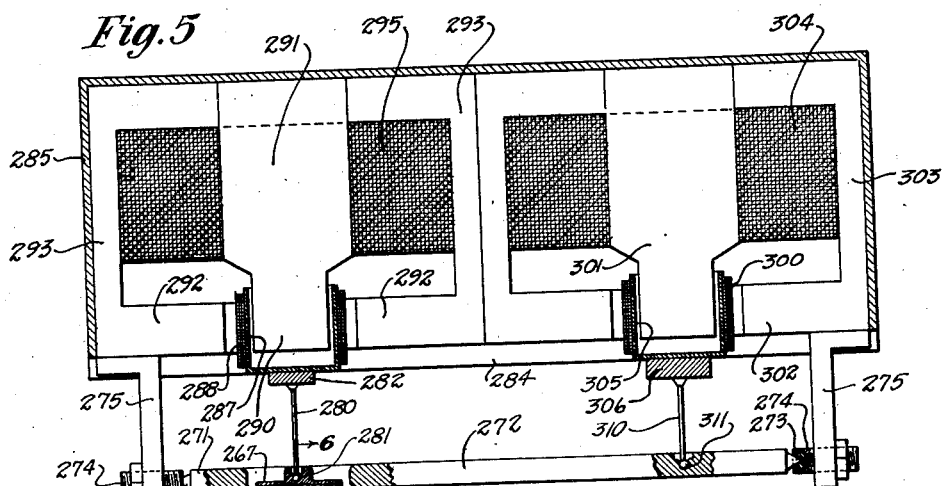
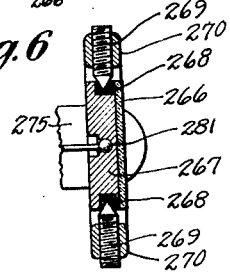
Inventor
John M. Cage.
Attorney.

Patented Feb. 19, 1946

2,395,099

UNITED STATES PATENT OFFICE 2,395,099

INVISIBLE RAY VISION SYSTEM

John M. Cage, Los Angeles, Calif., assignor to Sturdy-Cage Projects, Inc., Los Angeles, Calif., a corporation of California Application July 6, 1935, Serial No. 30,129

40 Claims. (Cl. 178—6.8)

The present invention is directed generally to a method and system for forming an instantaneously visible image of a field of view through utilization of certain refractive or reflective rays naturally or artificially radiated or reflected from the field, and usually outside the normal visual spectrum, which image may be directly observed or be transmitted to a distant viewing station. Certain of the rays in contemplation are more penetrative of material substances than are most of the rays within the normal visual spectrum, and are also available in darkness as well as daytime, being therefore useful for image formation in many situations in which ordinary visual light fails, as well as under conditions of normal visible light. For instance, rays at and beyond the longer wave length end of the visual spectrum, as infra red rays, are relatively highly penetrative of fog, and may be picked up and utilized at night, as well as in daylight, and such rays are frequently capable of forming a relatively definite image of a field of view when an image in visible light could not be obtained, or would be very faint in character. Of course, an image formed by rays outside the visible spectrum is invisible to the eye, and special methods provided by the present invention are required to render it useful.

It may be stated as a particular object of one specific form of the invention to provide a system capable of forming an instantaneous visual image or "motion picture" of objects in a darkened field of view, as of objects obscured by fog or otherwise rendered invisible, as well as of objects under conditions of normal daytime vision.

The present invention is not to be confused with infra-red photography, which is the taking of still photographs either in the presence or in the absence of visual light by use of photographic plates chemically sensitized to infra-red rays, which are later developed and printed. In contra-distinction to infra-red still-photography, the present invention permits instantaneous observation of the field of view, as on a viewing screen, either at the viewing instrument, or at a remote receiving station. It may be compared with infra-red photography, however, insofar as it may utilize an image of the field formed in infra-red rays radiated from the field.

The present invention, in one of its illustrative forms, is based in part on the fact that certain substances are, on the one hand, excited or energized to fluorescence by certain energies or radiations such as cathode rays or ultra-violet radiation; and on the other hand are repressed in fluorescence by certain other energies. For instance the luminescence of a zinc sulphide screen under the excitation of certain rays of short wave length, as cathode rays, ultra-violet rays, violet rays, X-rays, etc., is repressed in the presence of infra-red rays. See Nicols and Merrit, "Studies in Luminescence," Carnegie Institute of Washington, Pub. No. 152, 1912. The explanation of this phenomenon is still obscure, but it is a known and demonstrated fact that rays of relatively long wave length, as infra-red rays, repress or interfere with the luminescence of certain fluorescing substances caused to fluoresce under the influence of rays of shorter wave length, as ultra violet rays, or of cathode rays.

The illustrative system of the present invention takes advantage of this fact by casting on a suitable fluorescing screen an infra red image of the object to be viewed, the result being that the infra-red image causes a depression in the luminescence of the screen corresponding to its own intensity characteristics, so as to produce an image in differential values of luminescent light intensity. In one form of the invention, this fluorescent screen is the screen of a special cathode ray tube, which is provided with a lens adapted to view the scene to be taken and to cast an image of that scene in infra-red rays on the fluorescent screen of the tube. The cathode ray beam impinging on the screen produces the usual fluorescent spot, and when the beam is deflected to traverse the screen, the intensity of the moving light spot, at its original fluorescing frequency, varies in accordance with the infra-red intensity at different points on the screen. The interaction between the cathode ray beam and the infra-red ray image accordingly results in a fluorescent light image on the screen of the tube. This image, however, unless intensified in some manner, may be very faint in character, and entirely invisible to the human eye. Accordingly, this image is preferably not directly viewed by the observer.

A second cathode ray tube is preferably provided for the purpose of producing an image capable of being observed by the eye. A photoelectric cell is placed opposite the fluorescent screen of the first tube, and produces an electric picture current varying in accord with changing brilliancy of the fluorescent light spot as it moves over that screen. This electric picture current is suitably amplified, and then utilized to control the beam intensity of the second tube. The beam of the second tube is deflected in synchronous relation with that of the first tube, and the result is reproduction of the image on the screen of the second tube, but with sufficient amplification or intensification that the image is brought up to good visibility.

I also provide a means of regeneration whereby the fluorescent light image on the screen of the first tube may be greatly intensified. A portion of the picture current from the photoelectric cell is utilized, with or without amplification, to control the beam intensity of the first tube. Thus, brilliancy variations of the fluorescent light spot produced by virtue of the infra-red image on the screen are regeneratively reenforced by corresponding variations in the cathode ray beam producing the spot, the fluorescent light image on the screen of the second tube therefore being intensified. Further, it will be obvious that this same process of regeneration is applicable to any system of picture formation utilizing a fluorescent screen, or any other screen or optical plane, impinged upon by a moving activating or image forming beam, and is not limited to the special case in which such a beam scans an infra red image cast on the screen.

I may also, in some instances, provide a system of regeneration for the second or receiving tube. A photoelectric cell is placed in association with the screen of the second tube, and produces a second picture current, which, either with or without amplification, is used to reenforce the original picture current controlling the tube. By this means the variations in intensity of the cathode ray beam may be considerably amplified. When utilizing such regeneration with respect to the second tube it is not always convenient nor desirable to attempt direct viewing of the image on the screen of this second tube, and I therefore, in some cases, utilize a portion of the second picture current to control the beam intensity of a third cathode ray tube, the screen of which is designed to be viewed directly by the eye of the observer. The beam of the third tube is deflected in synchronous relation with that of the second tube.

I also provide an alternative system employing an exciting beam of light capable of reflection and refraction, such as ultra-violet rays, in place of cathode rays to cause fluorescence of the screen. This beam is deflected in two directions, so as to sweep over the area of the screen, by the action of some suitable moving optical element, as a mirror vibrated on two axes at right angles to one another. Such deflected beam system may be substituted for any one or more of the cathode ray tubes in the system above described and the methods of regeneration and amplification applied thereto.

It is contemplated that the described visual image may be transmitted to a remote station, if desired, either by metallic conductors, or by radio.

The illustrative system of the present invention contemplates employment of any ray which will cause fluorescence of any selected screen which in turn may be depressed by the superimposition of certain interfering rays coming from the field of view (such as rays in the red or infra red region). The character of the luminescent screen is of primary importance in obtainment of the desired result, and while other screens may be found suitable, and are contemplated by the present invention, a zinc sulphide screen is described at this time. The invention is not to be considered as limited, however, to any specific screen materials here named, or to any specific exciting ray or to any specific depressing or quenching ray. And while the particular form of my invention here chosen for illustrative purposes employs a screen or plate of a fluorescent type, this is not to be understood as limitative on the invention, since the invention contemplates broadly the use of any photo-reactive screen or plate such as may be activated to produce a reaction by radiations of one kind and whose reactive intensity may be modified or repressed by radiations of another kind, so long as the reaction is of a type capable of being utilized in reproducing the image. This reaction may preferably, though not necessarily, be an emanation, as for instance a light ray emanation (as employed in the present illustrative embodiment of the invention), or any other emanation capable of being utilized. Thus in certain broader aspects the specific nature of the screen or plate is not controlling, the invention consisting in the combined or simultaneous use of radiations of different kinds or wave lengths having the described differential effects on a photo-reactive plate. And by the expression photo-reactive plate, as herein used, I refer to a plate whose response range to the relatively long wave length rays is not necessarily limited to the infra red region immediately below the visible red, but may extend from and including the red downwardly in the invisible electromagnetic wave spectrum through the infra red to and including any usable wave length. Plates of different physical characteristics will give optimum response to different portions of the relatively long wave length rays, as may be determined for any given plate. By the expression relatively long wave length rays, I of course refer to electromagnetic waves which are relatively long as compared with the visible spectrum, beginning with the longer wave lengths of the visible spectrum, and extending therebeyond to any usable longer wave length.

The details of the invention here outlined, as well as various objects and features not preliminarily mentioned, will be fully understood from the following description of a present preferred embodiment thereof, reference for this purpose being had to the accompanying drawings, in which:

Fig. 1 is a diagrammatic view of a system in accordance with the present invention;

Fig. 2a shows a modified system;

Fig. 4 is a front elevation of the mirror deflection means, being a view taken as indicated by line 4—4 of Fig. 2;

Fig. 5 is a horizontal section taken as indicated by line 5—5 of Fig. 4;

Fig. 6 is a detail taken as indicated by line 6—6 of Fig. 5;

Fig. 7a shows a regenerative receiving system applied to the system of Fig. 7;

Fig. 8 is a chart illustrative of certain phenomena involved in the present invention.

Figure 7:
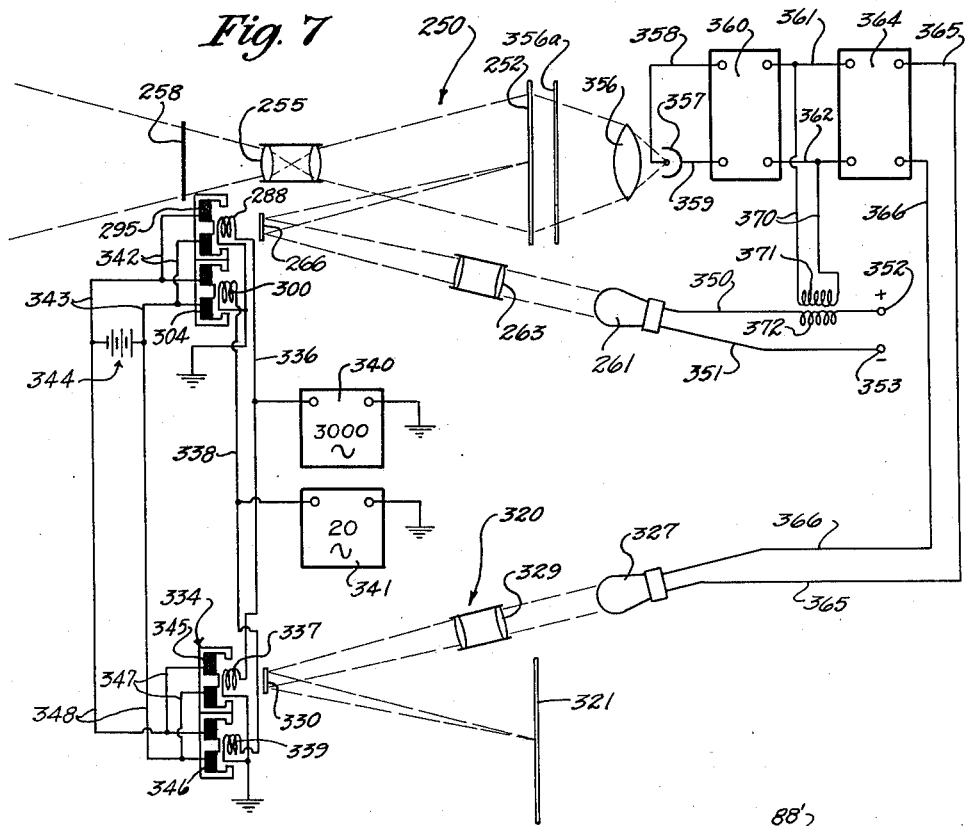
Fig. 7 is a diagrammatic view showing the electrical connections of the ultra violet ray system and corresponding to the apparatus disclosed in Figs. 2 to 6.

Reference is directed first to the chart of Fig. 8, which may offer in a general way a picture of the phenomena involved in the system. Many substances, if indeed not all, fluoresce under the influence of certain energies, as ultra violet light, cathode rays, etc., and have their fluorescence quenched by subjection to other energies, as infra red rays. Among these substances may be mentioned zinc sulphide (Sidot Blende), barium sulphide, strontium sulphide, calcium sulphide, Balmain's paint, etc. The effect of these energies on different substances varies, and for any substance a chart may be prepared representing the effect on its fluorescence characteristics of radiations of various frequencies or intensities. Fig. 8 shows a chart which may be generally representative of a fluorescent substance adaptable to the present invention. This chart has two curves F and Q, the first picturing the relation between wave lengths of fluorescence-inducing rays and time required for fluorescence to occur, and the second showing the relation between wave lengths of quenching rays and time required for a given fluorescence to be quenched, it being understood that some small but inevitable time lag will typically be found between impingement of the fluorescence inducing ray on the fluorescent material and appearance of fluorescence, and between impingement of a quenching ray on a fluorescing material and obtainment of quenching effect. Such a chart is indicative of the fluorescence-inducing effect of rays of various wave lengths on the substance in question, and also of the quenching effect of rays of various wave lengths on fluorescence. The dotted portions of the two curves F and Q, both of which approach base line B as an asymptote, represent regions in which, for the substance in question, neither a fluorescing nor a quenching action is produced, and this region may be referred to as the zone of neutral wave lengths for the substance charted. The chart here pictured employs electromagnetic wave lengths as ordinates. Since a cathode ray is comparable in its fluorescence-inducing behavior to the shorter wave length electro-magnetic waves, the chart is also generally illustrative of fluorescence as induced by cathode rays, and of repression of such fluorescence by other rays.

As will become apparent as the description proceeds, my invention contemplates employment of any fluorescence-inducing ray which has a high fluorescing effect and short time lag for the particular fluorescent material employed, and any quenching ray which has a high quenching effect with short time lag for that same fluorescent material, such as indicated by the chart of Fig. 8. However, it is to be understood that while I offer the chart of Fig. 8 as picturing in a general way the nature of certain phenomena involved in my invention, I do not limit myself thereto, but contemplate employment of any rays giving effects residing within the broad scope of my invention.

It has been stated above that the fluorescent substances mentioned decrease in fluorescence in the presence of an interfering ray, as infra red, for example, and it has been stated that Sidot Blende is a typical example of a substance whose fluorescence is depressed by infra red rays. Balmain's paint was also mentioned as a substance whose fluorescence was quenched by infra red. As shown by Nicols and Merrit, in the publication mentioned above, however, the repression of the fluorescence of Balmain's paint in the presence of infra red is preceded by a brief period of actual increase in fluorescence. It will become evident that any alteration in fluorescence brilliancy, whether increase or decrease, will produce an image which may be viewed in accordance with the present invention, and that any fluorescent substance may be used which will alter in fluorescence brilliancy (either increase or decrease) under the influence of the rays coming from the field to be viewed.

In Fig. 1 of the drawings, which is entirely diagrammatic, numeral 10 designates a special cathode ray tube in accordance with the present invention. This tube comprises a glass envelope having a usual neck 11, within which are contained the cathode and the control and deflecting elements, and a flared bulb 12 terminating in an enlarged screen end 13 having an inner coating 14 of a fluorescent material suitable to the instant requirements. I prefer to use for this purpose a coating of zinc sulphide although other substances may be found suitable.

Tube 10 has on one side, and about midway of its length, an offset or shoulder 16, which is so formed as to face oppositely to the screen end of the tube. This shoulder must be of a material to pass certain rays (for instance, infra red), and is made optically flat, so as to avoid distorting the image formed by the rays on the screen. If desired, an optically flat piece of glass, of the proper characteristics for the ray to be employed, may be mounted in shoulder 16 and sealed in place at the time of blowing of the tube. The screen end 13 of the tube preferably is not disposed at exact right angles to the main longitudinal axis 0—0' of the tube, but is tilted slightly toward shoulder 16. For instance, end 13 may preferably be disposed at right angles to an imaginary line which bisects the angle between axis 0—0' and a center axis F—F' defined by the approximate center of tube shoulder 16 and the center of screen 13.

The type and arrangement of the control elements used within the neck of tube 10 are subject to wide variation; I show typically a cathode 20 heated by a filament 21, a control element or grid 22 in front of or associated in any desired manner with the cathode, an anode 23, a second anode 24, a pair of horizontal deflecting plates 25, and a pair of vertical deflecting plates 26.

A second cathode ray tube 30 is provided, and this tube may be of conventional form, having usual neck 31, flared bulb 32, and fluorescent screen 33, of any suitable type. For example, screen 33 may be formed as a coating of Willemite on the inner surface of the enlarged end of the tube. The control elements within tube 30 may be the same as shown within tube 10, comprising cathode 34, filament 35, control element or grid 36, anode 37, second anode 38, horizontal deflecting plates 39 and vertical deflecting plates 40.

In the ordinary situation, tubes 10 and 30 will both be a part of the equipment at the pick-up or transmitting station, although, as will later become apparent, tube 10 may be at the transmitting station and tube 30 may be located at a distant receiving station. For the present, however, tube 30 may be considered as placed at the same station with tube 10.

As here shown, filaments 21 and 35 of the two tubes are connected in parallel across heater supply terminals 42, 43; thus the cathode side of filament 21 is connected by lead 44 directly to heater terminal 43, and the cathode side of filament 35 is connected by lead 45 to lead 44 and terminal 43, while the other side of filament 21 is connected by lead 46 to heater supply terminal 42, and the corresponding side of filament 35 is connected by lead 47 to lead 46 and terminal 42. Filament lead 46, thus connected to the filaments of both tubes, is connected by a lead 49 to the variable arm 50 of a potentiometer 51. This potentiometer is connected across the high voltage source of direct current supply for the tubes, and arm 50 is set to contact said winding at or near its negative end, as indicated. The negative side of the D. C. supply voltage is thus applied to the cathode of both tubes.

Connected to first anode 23 of tube 10 is a lead 55, and branching from lead 55, is a lead 56 which is connected to first anode 37 of tube 30. A movable arm 57 of potentiometer 51 is connected to lead 55, and this arm of the potentiometer is adjusted to take a selected mid-point position on the winding, so that anodes 23 and 37 of the two tubes are operated at potentials which are suitably positive with reference to their respective cathodes.

Connected to second anode 24 of tube 10 is a lead 60, and branching from lead 60 is a lead 61 which goes to second anode 38 of tube 30. An arm 62 of potentiometer 51 is connected by lead 63 to second anode lead 60, and contacts the potentiometer winding at a point at or near its positive terminal.

A conductor 66a within tube 10 connects second anode 24 with one of the horizontal deflecting plates 25 and also with one of the vertical deflecting plates 26, and a conductor 67a within tube 30 connects second anode 38 with one of the horizontal deflecting plates 39 and also with one of the vertical deflecting plates 40.

The other horizontal and vertical deflecting plate terminals of tube 10 are connected to leads 66 and 67, respectively, and lead 66 has a branch 68 connected to the other horizontal deflecting plate terminal of tube 30, while lead 67 has a branch 69 connected to the other vertical deflecting plate terminal of tube 30. An oscillation generator 70, typically of 20 cycles, is connected by lead 71 to vertical deflecting plate lead 67, and an oscillation generator 72, typically of 3000 cycles, is connected by lead 73 to horizontal deflecting plate lead 66. The pairs of horizontal and vertical deflecting plates of the two tubes will be seen to be connected in parallel across their respective oscillation generators, and the plates of each pair will be synchronously energized by the oscillation currents produced in their circuits by the oscillators. The oscillation generators themselves may be of any suitable conventional type. For instance, the well known "saw tooth" wave oscillator may be employed.

Mounted outside shoulder 16 of tube 10, on center line F—F', is an objective lens combination 80a, which is adapted to view the scene or field to be taken and observed and/or transmitted, and which may be provided with any suitable focussing arrangements, not shown. This objective is indicated in Fig. 1 as mounted within a conical case 82a conforming generally to the angle of view of lens combination 80a. In a practical installation, tube 10 and casing 82a are mounted as a unit, which may be moved about to bring the desired field or object within the angle of view of lens 80a. Preferably, though not necessarily, a filter 83a designed to pass only infra red rays is mounted in casing 82a in front of lens 80a. This filter excludes substantially all light rays within the visible spectrum, so that the system is independent of visible lighting conditions. It is to be understood, however, that while I prefer to utilize a filter member 83a which will exclude visible light, the system is nevertheless operative even though visible light is permitted to reach lens 80a and screen 13, and the invention in its broader aspects is therefore not to be considered as restricted to use of the infra red ray passing filter here mentioned as desirable.

Objective 80a, which may have any usual provisions for focusing, is adapted to cast an image of the field of view on the fluorescent screen end 13 of cathode ray tube 10. If all else but infra red rays be excluded by filter 83a, this image is of course formed by infra red rays, and normally is invisible to the eye.

At the same time that such an infra red image is formed on the screen end of tube 10, the tube is operated to produce a cathode ray beam. This beam is formed when cathode 20 is heated by filament 21, and moves from the cathode to impinge on the fluorescent screen at the large end of the tube, producing a fluorescent light spot where it strikes the screen. The character of the beam is determined, among other factors, by the voltages applied to the several control elements of the tube, as is well understood by those skilled in the art. It will also be understood how the cathode ray beam, under the combined influence of the two right angled deflecting plate fields produced by the oscillation currents flowing in the horizontal and vertical deflecting plate circuits, will be so deflected as to traverse the area of screen 13, for instance, in a succession of horizontal "sweeps" of suitable vertical spacing. In the absence of an infra red ray image on screen 13, such deflection of the cathode ray beam causes a uniform fluorescent line to be repeatedly traced over the area of the screen. As the entire screen is traversed a great many times per second, its area fluoresces uniformly under such conditions.

The fact that infra red rays have an interfering or depressive effect upon the fluorescence of a zinc sulphide screen has been mentioned above. By virtue of this effect, the brilliancy of the fluorescent line traced across the screen by the cathode ray beam varies with the character of the infra red image cast on the screen by objective 80a. Thus, where there is no infra red on the screen, the fluorescent line traced by the beam will be of a certain normal or maximum brilliancy. But where the cathode ray beam encounters an infra red image on the area of the screen, the fluorescent line will be dimmed in passing over it, in an amount depending upon the infra red intensity. The fluorescent screen accordingly bears an image in fluorescent light values corresponding (negatively) to the infra red invisible image, and the nature of causation of this image is a brilliancy alteration (in the present instance, a dimming) of the otherwise uniform fluorescence, of the screen. It will be evident that in the present instance the image in fluorescent light thus formed on the screen will be in the nature of a negative, considered with reference to the infra red image, being more intense where the infra red image is least intense, and being least intense where the infra red image is most intense. Thus the screen, under continuing irradiation by the fluorescence activating ray (in this instance a cathode ray), and subjected to an optical image of the field of view in relatively long wave length radiant energy received from the field of view (such as infra red), bears a fluorescent image in differential values of fluorescent light in accordance with the local intensities of the relatively long wave length radiant energy image. And if an object in the field of view is moving about, the optical image thereof is cast on the screen in successively different positions, producing a fluorescent light image in corresponding positions, while the irradiation of the screen by the fluorescence activating rays is continued, whereby portions of the screen whose fluorescence was previously modified by the long wave length energy image are restored to original fluorescence brilliancy by the continuing activating rays. The continuing activation thus destroys the old image, but permits the formation on the screen of a continuing contemporaneous image of the field of view. In spite of movement relative to each other of the screen and field of view, or portions thereof, therefore, a continuing moving image of a moving object in the field of view is produced, instead of a blur, as would result without continuing activation.

It will be understood that the fluorescent light image on screen 13 may be very faint in character, and may not be at all perceptible to the human eye, or, may be imperceptible because of being outside the visible frequency range of the human eye. Accordingly, photoelectric means are provided to detect the image and to produce an electric picture current which can be amplified sufficiently to produce the desired perceptible image in a separate cathode ray or other receiving apparatus, or, by regeneration, on the same cathode ray screen, which may then be transferred to a separate cathode ray or other receiving apparatus.

In Fig. 1 there is shown positioned opposite screen 13 of tube 10 a lens 80, which gathers light rays emanating from screen 13 and brings them to a focus on the cathode of a photoelectric cell 82. Preferably, a filter 81 designed to stop all rays below the green is placed between screen 13 and lens 80, this filter preventing all rays except those in the green and above from affecting the photoelectric cell. In some cases I may use a filter 81 designed to take out also a part or all of the green, or certain other light, as circumstances may require. This provision prevents the after-glow of the fluorescent screen from reaching cell 82, which would prevent the tube from giving its maximum response to each succeeding picture element. It also prevents infra red rays from reaching the cell. Cell 82 is connected by leads 83 and 84 to the input terminals of a suitable amplifier 85, lead 84 including photo-cell battery 86.

The output leads 85a and 85b of amplifier 85 are in the present scheme connected to the input terminals of a second amplifier 87. One output terminal of amplifier 87 is connected to a lead 88, having a branch lead 89 connected to control grid 36 of cathode ray tube 30, lead 89 including a condenser 90. Control grid 36 is given a negative bias with reference to heater 35; for instance, the movable arm 91 of a potentiometer 92 is connected to lead 89 between condenser 90 and the control grid, and potentiometer 92 is connected across a battery 93, the positive terminal of which is connected to a heater element lead 45, as shown. The variable potentiometer 92 thus gives a means for adjusting the negative grid bias applied to control grid 36. The other terminal of amplifier 87 is grounded, as at 95, and is also connected by wire 96 to the lead 60 which interconnects the second anode elements of tubes 10 and 30.

It will be understood that photo-cell 82 will be light affected by the varying intensity spot of fluorescent light travelling over cathode ray tube screen 13 as the cathode beam traverses the area of the infra red image thereon, and that corresponding electrical signal or picture currents, proportionate to the tones of successive points of the image, will be successively generated in the photo-cell circuit and will be conducted into amplifier 85. After suitable amplification, this electrical picture current or currents is applied by way of conductor 88, and condenser 90, to the control grid 36 of tube 30. Since the connections shown between amplifier 85 and cathode ray tube 30 are more or less conventional, it will readily be understood by those skilled in the art how control grid 36, its normal negative potential thus varied by superimposition of the picture current output of amplifier 85, acts to vary the intensity of the cathode ray beam of tube 30 in accordance with the picture current. And since the beam of tube 30 is deflected in synchronism with the deflection of the beam in tube 10 (by reason of the parallel connection of the deflection circuits energized by generators 70 and 72), the characteristics of the visual image on screen 13 of tube 10 are reproduced on the screen 33 of tube 30, but with a high factor of intensification due to the electrical amplification employed between the tubes. It will be understood that this amplification is made sufficient that the image on the screen of tube 30 becomes visible to the eye. It will also be understood how the operation of amplifying from tube 10 to tube 30 may be repeated, if desired, from tube 30 through a similar amplifying system to another tube. Preferably, photo-cell 82, amplifiers 85 and 87 and grid of tube 30 are connected with such polarities that a decrease of light on the photo-cell causes an increase of brightness of the light spot on the screen of tube 30. It being recalled that the image on the screen of tube 10 is in the nature of a "negative," a "positive" image will accordingly be formed on the screen of tube 30. However, I may in certain cases connect the various elements with such polarities that a "negative" image on the screen of tube 10 is reproduced as a "negative" on the screen of tube 30.

As has been stated, the "visible" image on the screen of first tube 10 may be very flat or faint in character; so much so that it could not be detected by the human eye, and such that very great amplification is necessary between photo-cell 82 and tube 30. Therefore, to increase the contrasts of the fluorescent light image on the screen of tube 10, I employ a system of regeneration.

This regenerative system applies a portion of the picture current output of the photo-cell circuit to the cathode ray tube in such a manner as to vary the intensity of the cathode beam with variations in brilliancy of the fluorescent light spot. This result may be accomplished in various manners, one typical scheme being indicated in Fig. 1. As there shown, a lead 97 is connected between an output lead 85a of amplifier 85 and the control grid 22 of tube 10, lead 97 here being shown as including condenser 98 and variable resistance 99. A portion of the picture current output of amplifier 85 is thus capacitatively coupled to a beam intensity controlling element of the tube. Resistance 99 is for the purpose of control of regeneration through variation of the amplitude of the picture current fed back to the control grid. Such control may also be had through regulation of the gain of amplifier 85, which may be through the medium of any usual gain control, and in such case resistance 99 might be eliminated. In another form of the invention, hereinafter described, a regenerative connection involves an inductive coupling, and it is to be understood that either method of coupling, or any other found suitable, may be employed in either situation. Means are provided for applying an adjustable negative bias to control grid 22. As here illustrated, the moving arm of a potentiometer 100 is connected by conductor 101 to lead 97 between variable resistance 99 and control grid 22. This potentiometer 100 is connected across a battery 102, the positive terminal of which is connected to filament lead 44, as shown.

Photoelectric cell 82, amplifier 85 and grid 22 are so connected that a decrease in light on the photo-cell causes an increase in negative potential on grid 22, which in turn causes a decrease in intensity of the cathode ray beam spot on the screen. This obviously results in a still greater decrease in light on the photo-cell, and therefore a further increase in negative potential on grid 22, with a further decrease in intensity of the cathode ray spot, and so on. Similarly, an increase in light on the photo-cell causes a decrease in negative potential on grid 22, this causing an increase in the intensity of the spot on the screen, and therefore a further increase in light on the cell, and so on. Thus either an increase or decrease in light intensity on the cell, caused by the cathode ray beam traversing elements of different densities of the infra red image, is immediately reenforced by a process of regeneration, with the result that the original range of contrasts of the fluorescent light image on the screen is increased many times. The extent of such regenerative intensification of the image may be controlled within amplifier 85, or may be controlled by means of the variable resistance 99 provided for that purpose, as previously noted. In the event that control of regeneration is effected within amplifier 85, the variable resistance 99 might be omitted.

Thus by a process of regeneration the fluorescent light image on screen 13 is greatly amplified or intensified. In some instances this intensification may be sufficient to bring out an image on screen 13 that is visible to the eye. In any event, the increased contrasts of the picture, whether noticeable to the eye or not, result in production of a photo-cell picture current of increased amplitude. This means that the amplification required within amplifier 85 is reduced, or that with amplifier 85 of given amplification, the strength of the final picture current applied to the control grid of tube 30 is increased.

I have now described how my system forms an infra red image of a given object on the screen of a cathode ray tube, and how such image alters the degree of brilliancy (fluorescence) of the moving light spot produced by the cathode ray beam, whereby an image of the object is formed on the screen in varying intensity values of fluorescent light. As stated, this image may be relatively flat or faint without amplification, or intensification, and for such purpose I may employ a scheme of regeneration, which considerably increases the range of light values present in the image. If such regeneration is made of sufficient effect, the image may become visible to the eye on the screen of the same tube. However, whether or not regeneration is employed, recourse is preferably had to a second cathode ray tube for formation of the image viewed by the observer. To this end, a second cathode ray tube is employed, and is so connected to the first that the beams of the two are synchronized. The picture current output of the first tube and associated photo-cell are amplified and then utilized to control the intensity of the cathode beam of the second tube. The image formed on the screen of this second tube is greatly amplified or intensified as compared with that formed on the screen of the first tube, is of a visible frequency, and may be viewed directly by the observer.

In a system thus utilizing two cathode ray tubes and the visual picture formed on the screen of the second, it will readily be understood that the light emanating from the screen of the first tube need not necessarily be in the eye-visible range, but only need be in the range of "visibility" of the photo-electric cell or other equivalent radiation sensitive element. Thus, in such a case, the fluorescence of the first screen 13 need not be in light "visible" in the ordinary sense. However, if by regeneration or any other means, the intensity of picture on screen 13 is brought up to ordinary visibility, then it may be desirable at that point to use eye-visible light; and it may be then feasible to eliminate the cathode tube 30.

The two tubes so far described may be located at a common station, though not necessarily so, since the receiving tube 30 may obviously be placed at a remote location. Ordinarily, however, when it is desired to transmit the image to a distance, either by wire or by radio, the two aforementioned tubes 10 and 30 are both placed at the sending station, and one or more additional tubes, synchronized with and controlled by tube 10, are placed at the receiving station or stations. Fig. 1 shows such a remote receiving tube at 110. This tube 110 may, if desired, be exactly similar to tube 30, and is here indicated with corresponding control elements, designated by the same numerals as applied to tube 30, but with primes annexed. The currents carried by tube-connecting leads 49, 55, 60, 66, 67 and 83 must be transmitted to each distant receiving station tube 110, and for this purpose said leads may be extended to the receiving station, or various well known systems of transmission reducing the number of, or eliminating entirely, the metallic conductors between transmitting and receiving stations may be employed. I simply conventionally indicate a transmission system at 112, and this system may be understood as including any necessary sending and receiving apparatus. It will also be understood that this system may consist of separate metallic conductors, a carrier system, or radio. The receiving station wires 49', 55', 60', 66', 67' and 88' carry electric currents corresponding to those in leads, 49, 55, 60, 67 and 88, respectively, and are connected by branch wires 113, 56', 61', 68', 69' and 89' to the proper elements of tube 110, so that corresponding elements of tubes 10, 30 and 110 are parallel connected.

Tubes 10 and 30, being at the same station, are indicated as served with a common heater supply. Tube 110 at the receiving station, however, may preferably have a separate heater supply, as indicated at 114.

It will be readily understood that tube 110, connected as described, will operate synchronously with tubes 10 and 30, and its screen 33' will carry an image corresponding to that on screen 33 of tube 30.

Figure 1A:
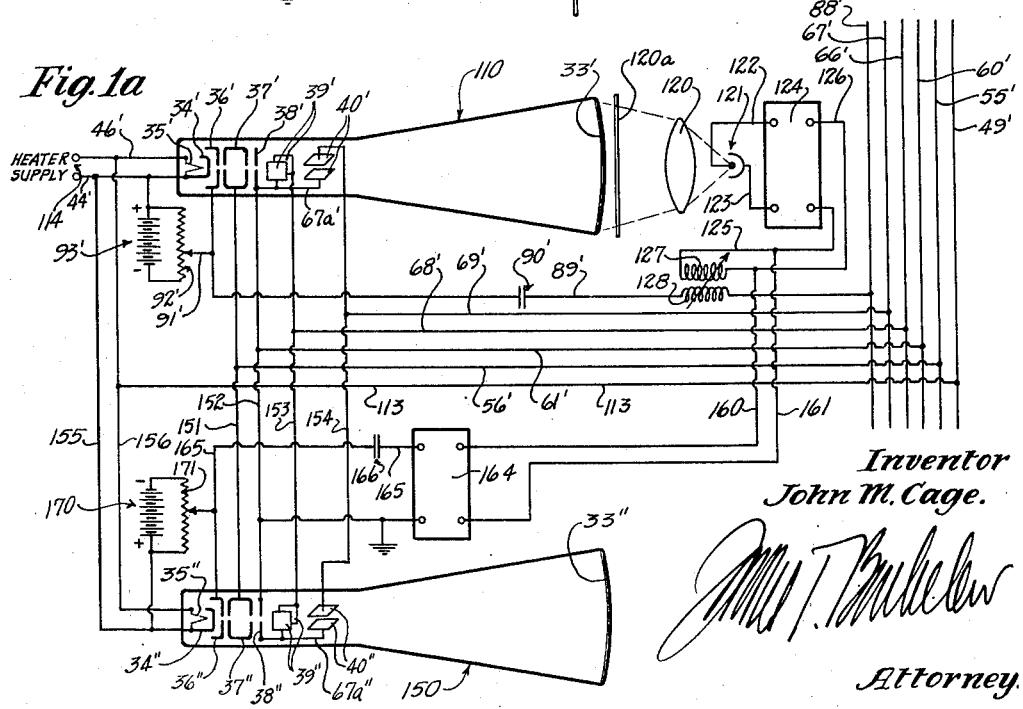
Fig. 1a shows a regenerative receiver arrangement which may be incorporated with the system of Fig. 1.

I may also employ a system of regeneration for intensification of the image upon the screen of either of the receiving tubes, as tubes 30 or 110. For the purpose of illustration of such a system, I refer to Fig. 1a, which shows the tube 110 of Fig. 1 provided with a regenerative system. Tube 110 is shown in Fig. 1a with the same elements as shown in Fig. 1, identified by the same reference numerals, and is also shown with the same electrical connections, which are to be understood as leading from the transmission system 112 of Fig. 1.

Located in any position suitable to collect light rays from the screen 33' of tube 110 is a lens 120, and this lens concentrates said light rays onto a photoelectric cell 121. Preferably, a filter 120a designed to take out rays constituting the "after-glow" from the fluorescent screen is placed between the screen and lens 120. This filter may be of the same nature as filter 81 used between screen 13 and lens 80 (Fig. 1). In Fig. 1a, lens 120 and photoelectric cell 121 are simply diagrammatically shown as positioned immediately opposite screen 33'. In a practical installation, the apparatus may be so physically arranged that the observer's view of the screen will not be obstructed. It should be noted that screen 33' and the photo-cell should be in darkness. If it is desired that the image be capable of observation in a light room, a further cathode tube is used, screen 33' and the photo-cell being enclosed, as described hereinafter. Photoelectric cell leads 122 and 123 are connected to the input of an amplifier 124, and the output leads 125 and 126 of amplifier 124, in the illustrative embodiment of the invention, are connected to a coil 127 inductively coupled to a coil 128 included in the control grid energizing lead 89'. It will readily be understood how variations in brilliancy of the light spot on screen 33' produce a corresponding picture current in photoelectric cell circuit 122, 123. This electrical picture current, after amplification, acts through the coupled coils 127 and 128 to reenforce amplitude variations in the electrical picture current flowing in lead 89' connected to control grid 36'. The electrical picture current in control grid lead 89', thus regeneratively reenforced, thereupon causes regenerative reenforcement of intensity variations of the cathode ray beam as it traces out the image of the field on screen 33'. Thus by this means the image on the receiving screen is greatly intensified. The extent of such regenerative action may be properly controlled in any manner; for instance, the coupling between coils 127 and 128 may be variable, as indicated in Fig. 1a.

In case it is not practical to view the image on the screen of tube 110 in the regenerative scheme of Fig. 1a, a further tube 150 is employed. This tube has its elements 37", 38", 39" and 40" connected to corresponding elements of tube 110 by conductors 151, 152, 153, and 154, respectively, and has its filament at 35" connected across the heater supply of tube 110 by means of lead 155 and 156. A pair of leads 160 and 161 is connected across amplifier output leads 126 and 125, and is connected to an amplifier 164. One output terminal of amplifier 164 is connected by conductor 165, which includes condenser 166, to control grid 36" of tube 150. The other output terminal of amplifier 164 is connected to second anode conductor 152. A negative bias is applied to control grid 36" of tube 150 by means of battery 170 and potentiometer 171, the movable arm of the latter being connected to control grid lead 165, and the positive terminal of the battery being connected to the heater side of the filament. It will be evident that the regeneratively amplified picture current in the output circuit of amplifier 124 will be effective through amplifier 164 and condenser 166 to control the beam of cathode tube 150 in such manner as to produce an intensified visible image on its screen 33".

Figure 2:
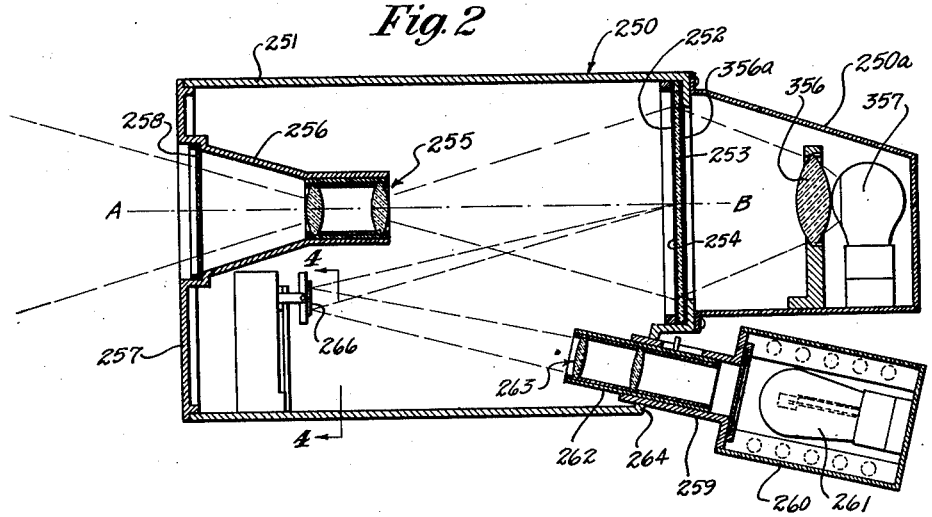
Fig. 2 shows in vertical section, and somewhat diagrammatically a pick-up unit adapted to employment of ultra-violet and other similar rays.

In Figs. 2 and 7 I show the invention adapted to employment of ultra violet rays in place of the cathode rays of the system previously described. It is to be further understood, however, that the means illustrated in Figs. 2 to 7 is not limited to use of ultra violet light, but may employ other rays which will produce fluorescence of the screen.

Fig. 2 shows the pick-up apparatus, which is designated generally at 250. This apparatus, which may be housed within any suitable case 251, is provided with a fluorescent screen 252, which may consist of a glass plate 253 provided on one surface with a coating 254 of fluorescent material adapted to fluoresce under the influence of ultra violet light, and also adapted to alter in fluorescence when infra red rays are added. Zinc sulphide is an example of such a material.

An objective lens 255 is positioned in front of the screen, preferably on the optical center line A—B of the screen, and is arranged and adapted to cast an image of the object or field to be viewed on the screen in infra red rays. As shown, objective 255 may be mounted in a conical member 256 conforming approximately to the angle of view of the objective, and opening through the front wall 257 of case 251. A filter 258 designed to pass only infra red rays is preferably used in the path of the light rays entering conical member 256, although this filter may in some instances be omitted.

Mounted in a wall 264 of case 251, in the present instance, below screen 252, is a lens and lamp supporting tube 259, the outer end of which carries a housing 260 for a glow lamp 261, and the inner end of which slidably receives a lens tube 262 carrying a projection lens combination 263 of quartz. Glow lamp 261 is preferably what is known as a crater type glow lamp, although any glow lamp, or any source of light whatever, capable of producing a beam of ultra violet rays, or other rays capable of causing fluorescence of the screen, may be employed.

Lamp 261 and lens 263 are optically aligned with the center of a small, light-weight mirror 266, which is adapted to reflect light rays from the lamp onto screen 252. In the preferred arrangement here indicated, mirror 252 is mounted below objective combination 255, but as near screen center line A—B as possible, while lamp 261 and lens combination 263 are located on such a line that rays from the lamp projected by lens combination 263 are reflected by mirror 266 to strike screen 252. Lens 263 is so focussed, by sliding lens tube 262 in tube 259, that the rays from the lamp form a small spot of light on screen 252.

Mirror 266 is mounted for movement of such a character as will cause the focussed light beam projected from lamp 261 to sweep over the area of screen 252, similarly to the sweep of cathode ray beam over the screen of a cathode ray tube as employed in television.

The mirror 266 and its preferred mounting and actuating means are shown more particularly in Figs. 4, 5 and 6. The mirror is illustrated as mounted on the front surface of a light carrier disk 267, which is pivoted on a vertical axis V—V' between center points 268. These points 268 are formed on the inner ends of studs 269 screwthreaded in the upper and lower sides of a ring 270 which surrounds disk 267, and which may be considered as a mirror carrier. This ring 270 has opposite horizontal shaft extensions 271 and 272, the ends of which have center points 273 pivotally mounted in suitable bearing sockets carried by studs 274 screwthreaded into fixed mountings 275. In the embodiments here shown, the axes defined by points 268 and by points 273 intersect one another.

Mirror 266 is thus mounted for pivotal action on a vertical axis V—V' defined by center points 268, and for pivotal action on a horizontal axis H—H' defined by center points 273. Means are provided for vibrating the mirror on these two axes in accordance with two oscillation currents of given frequencies. The mirror is moved on its vertical axis by means of a slender link 280 having a ball and socket connection 281 with mirror carrier disk 267 at a point just slightly off center with reference to the vertical mirror axis defined by center points 268, but located exactly on the horizontal axis H—H' defined by points 273. The ball and socket connection point 281 is placed on axis H—H', so that rotation of the arms or shaft 271, 272 on axis H—H' through a small deflection angle will not act to move the mirror about its vertical axis. Link 280 is connected to the upper end portion of a resilient cantilever arm 282, the lower end of which is rigidly mounted, as by means of screws 283, on a support 284, which may be rigid with a frame or casing 285. Also connected to the upper or free end of cantilever arm 282 is a coil frame 287 carrying coil 288. This coil is placed in a transverse magnetic field established between an inner pole piece 290 which forms an extension of an inner core 291, and an outer pole piece 292, which extends inwardly from an outer iron sheath 293, the latter joining inner core 291 at its end which is opposite to pole piece 290. The field winding 295 is placed on inner core 291, and is surrounded by sheath 293.

Coil supporting arm 282 is of such physical shape and characteristics that the natural period of the vibratory system constituted by said arm, coil 288, link 280 and the pivoted disk 267 and mirror 266 is substantially equal to the frequency of the oscillation current which flows in moving coil 288. This oscillation frequency may be, for instance, three thousand cycles per second. Assuming, therefore, that a current of such frequency flows in coil 288, and that field winding 295 is energized, it will be evident that said coil will tend to vibrate at the assigned oscillation frequency in a direction along its longitudinal axis, and that by virtue of the entire moving coil and mirror system having been given a natural period substantially equal to this oscillation frequency, the entire system will freely vibrate in step with the oscillation frequency of the current. Mirror 266 is thus deflected on its vertical axis at a frequency, in the present instance, of 3000 cycles per second. The angle of such vibratory deflection of the mirror of course depends upon the natural amplitude of vibration of supporting arm 282, together with the coil and mirror assembly which it moves. This angle of deflection of the mirror is made such as will cause the reflected light beam to travel between the two vertical edges of screen 252.

The mirror is vibrated on a horizontal axis by vibratory rotation of supporting arms 271 and 272 on their longitudinal axis. For this purpose, there is provided a second moving coil 300, mounted in the magnetic field between the pole piece on an inner core 301 and an outer pole-piece 302 extending inwardly from sheath 303, the field being produced by energization of field winding 304 surrounding inner core 301. Coil 300 is mounted on a frame 305 affixed to the upper end of a resilient cantilever supporting arm 306 which is attached at its lower end, as by screws 307, to the aforementioned support 284. Connected to the upper portion of arm 306 is a slender link 310, which has a ball and socket connection 311 with shaft 272 at a point vertically off-set by a short distance from the longitudinal pivotal axis of said arm (see Fig. 4). Accordingly, motion of coil 300 on its axis causes corresponding movement of link 310, and because of the off-set connection of the latter with carrier shaft 272, said shaft and the mirror are set into motion about the horizontal longitudinal axis of the shaft. The natural period of supporting arm 306, together with the coil assembly, and mirror system moved thereby, may typically be say twenty cycles per second. Accordingly, an electrical oscillating current of twenty cycles per second flowing in coil 300 causes vibratory movement of the coil assembly, supporting arm 306 and link 310 such as will cause vibratory rotation of shaft or arm members 271, 272, and therefore of the mirror, on horizontal axis H—H'. The physical apparatus involved in this vibratory action with reference to the axis H—H' is designed with such a natural amplitude of vibration as will cause the light beam reflected by the mirror to sweep back and forth between the two horizontal edges of the screen.

Mirror 266 is thus caused to vibrate about vertical axis V—V' in accordance with the oscillation frequency of an electrical current flowing in coil 288, and to vibrate about horizontal axis H—H' in accordance with the oscillation frequency of an electrical current flowing in coil 300. The resultant of the two vibrations is such that the mirror reflects the beam of light projected thereon from lamp 261 so as to sweep from side to side of screen 252 in a succession of vertically spaced "sweeps." Thus the beam of light sweeps repeatedly over the area of the screen in a manner similar to that accomplished within the cathode ray tube.

Figure 3:
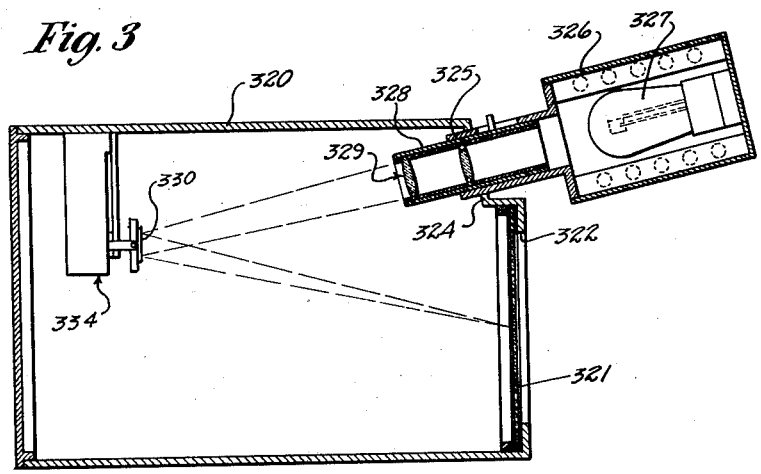
Fig. 3 shows in vertical section, and somewhat diagrammatically, a receiver unit adapted to employment of ultra violet rays.

Fig. 3 shows the receiving unit corresponding to the pick-up unit of Fig. 2. This receiving unit comprises a case 320 having a viewing screen 321 in one end. This screen may be either a ground glass screen, a glass screen provided with a coating adapted to fluoresce under influence of the light beam used, or any optical plane. A Willimite or zinc sulphide coating may be used with an ultra violet light beam. The case is provided with a window 322 opposite screen 321, through which the image formed on the screen may be observed. Mounted in a wall 324 over screen 321 is a lens and lamp supporting tube 325, the outer end of which carries a housing 326 for a glow lamp 327, and the inner end of which slidably receives a lens tube 328 carrying a projection lens 329. Lamp 327 and lens 329 are optically alined with the center of a small, light-weight mirror 330, like the mirror 266 described above, which is adapted to reflect light rays projected against it from lamp 327 onto the screen 321. The relative placement of the glow lamp, projection lens, mirror and screen within receiving unit 320 is preferably exactly the same as the relative placement of the glow lamp, projection lens, mirror and fluorescent screen within pickup unit 250, with the single exception that, in the present embodiment, the two systems are inverted with reference to one another. Lens 330 is provided with a double motion deflecting means, generally indicated at 334, which may be substantially the same as previously described for the mirror 266 within pick-up unit 250. Figs. 4, 5 and 6, which illustrated the details of the double motion mirror deflecting means provided for the mirror 266, may therefore be considered as also illustrative of the deflecting means 334 provided for mirror 330.

Fig. 7 is a diagrammatic view showing the electrical connections between pick-up unit 250 (Fig. 2) and receiving unit 320 (Fig. 3). As there indicated, the "horizontal-sweep" mirror deflecting coil 288 of pick-up unit 250 is connected by a lead 336 with the "horizontal-sweep" mirror deflecting coil 337 of the mirror deflecting means 334 of receiver 320, and the "vertical-sweep" mirror deflecting coil 300 of pick-up unit 250 is connected by a lead 338 with the "vertical-sweep" mirror deflecting coil 339 of mirror deflecting means 334. The other side of each of coils 288, 300, 337, and 339 is grounded, as indicated. Connected to lead 336 is one side of an oscillation generator 340, typically designed for an oscillation frequency of three thousand cycles per second, and connected to lead 338 is one side of an oscillation generator 341, typically designed for an oscillation frequency of twenty cycles per second. The other side of each oscillation generators 340 and 341 is grounded, as indicated. The field winding 295 and 304 of the double motion mirror deflecting means for mirror 266 are connected by leads 342 and 343 across a suitable source of electricity 344, and the field windings 345 and 346 of double motion mirror deflecting means 334 are shown as connected by leads 347 and 348 across the same source of electricity.

Glow lamp 261 of pick-up 250 is energized through leads 350 and 351 from any suitable source of electricity, not shown, connected across a pair of terminals 352 and 353.

Positioned opposite fluorescent screen 252, within unit 250, is a lens 356, which collects light from the fluorescent screen 252 and concentrates it on the cathode of a photoelectric cell 357. A filter 356a is preferably employed between screen 252 and cell 357, and is preferably designed to cut off all rays below the green. This provision prevents the after-glow of the fluorescent screen from interfering with succeeding picture elements. The output leads 358 and 359 of cell 357 are connected to the input terminals of an amplifier 360. In the arrangement here shown, the output leads 361 and 362 leading from amplifier 360 are connected to the input terminals of a second amplifier 364. The output leads 365 and 366 leading from amplifier 364 are connected to glow lamp 327 within receiver unit 320.

The complete operation of the system of Figs. 2 to 7 may now be understood. An image of the field of view is formed by objective lens combination 255 on fluorescent screen 252, and this image is substantially exclusively an infra red image because of the presence of infra red filter 258. Of course, the presence of additional rays, even within the visual spectrum, would not obviate operability of the system, although it is generally desirable to eliminate all rays except those directly utilized by the system, since any light not necessary to the system reaching the photo-cell interferes somewhat with its response to the changes in light values which constitute the picture elements. Glow lamp 261 constitutes a source of ultra violet light, and projection lens 263 is focussed to form a beam of light which is reflected by mirror 266 and forms a small and definite fluorescent light spot on screen 252. Oscillation generators 340 and 341 being in operation, mirrors 266 and 330 are set into synchronous double motion vibration, and the beam of light projected from lamp 261 is so reflected as to sweep continuously over the area of screen 252. In so doing, the beam traverses the area of the infra red image of the field of view which is cast on the screen by lens 255. Of course, in the absence of infra red light on the screen, the relatively rapid movement of the ultra violet light beam over the area of the screen produces the effect of a uniform fluorescence. When an infra red image is present on the screen, however, the screen fluorescence produced by the ultra violet light alters in accordance with varying intensities of the infra red light incident on the screen. In the instance of a screen comprising a coating of zinc sulphide, the fluorescence brilliancy dims with increase of infra red rays. There is accordingly produced on the screen an image of the field made up of fluorescent light values, the image being most intense where the infra red image is least intense, and vice versa, as in the previously described form of the invention.

As with the cathode ray system of Fig. 1, the image thus formed on screen 252 is apt to be comparatively faint in character. Accordingly, the system provides a secondary, intensified image, which is capable of observation by the human eye. The light values present on screen 252 act on photoelectric cell 357 to produce a picture current within circuit 358, 359. This current is amplified within amplifier 360, and again within amplifier 364, and in an amplified state is carried by circuit 365, 366 to the glow lamp 327 of the receiver. The glow intensity of lamp 327 varies in accordance with this amplified picture current, and the spot of light projected onto final viewing screen 321 by means of lens 329 and mirror 330 varies accordingly. And since mirrors 266 and 330 move in unison, the beams of light reflected by the two mirrors move in step with one another, so that an image is formed on screen 321 exactly like that present on screen 252, but greatly intensified because of the amplification of the picture current between photo-cell 357 and glow lamp 327. The amplification is made sufficient that this image on screen 321 becomes visible to the human eye. Glow lamp 327 may cast a directly visible image on screen 321, and in such case the screen may preferably be of ground glass; or the lamp may, like the cathode ray receiver, excite a fluorescent image on that screen, in which case the screen may have some suitable fluorescent coating.

I may also employ a method of regeneration to reenforce or intensify the fluorescent light image on screen 352. As indicated in Fig. 7, a pair of leads 370 is connected across output leads 361 and 362 of amplifier 360. These leads 370 energize a coil 371, which is inductively coupled to a coil 372 included in glow lamp lead 350. It will be evident that the glow lamp energizing current flowing in circuit 350, 351 will be varied in accordance with oscillations of the picture current flowing in circuit 370 and coil 371, and that the glow intensity of lamp 261 will vary accordingly. Thus, at a time when the brilliancy of the fluorescent spot on screen 252 is decreasing, due to increased infra red intensity, the energizing current in glow lamp circuit 350, 351 likewise decreases, accompanied by an immediate decrease of glow intensity of lamp 261, and therefore a regeneratively reenforced decrease in brilliancy of the fluorescent spot on the screen. And at a time when the fluorescent spot on the screen is increasing in intensity, due to decrease in infra red intensity, the increased amplitude of the picture current causes an increase in current in glow lamp energizing circuit 350, 351, and therefore an increase in intensity of the glow lamp, with an accompanying regeneratively reenforced increase in brilliancy of the fluorescent light spot on the screen. Thus by a process of regenerative reenforcement, the variations in brilliancy of the fluorescent light spot on screen 252 are greatly amplified, with the result of considerably intensifying the fluorescent light image on said screen. This means that the fluorescent image or screen 252 may become visible, or that in any case less amplification is required between the photo-cell and the receiver unit to produce an image on final viewing screen 321 that is sufficiently definite for observation by the eye.

I may also employ a regenerative scheme in connection with the receiving screen 321 of Fig. 7, such as indicated in Fig. 7a. In this figure there is again shown the double mirror set 334, projection lens 329, glow lamp 327 and screen 321 of Fig. 7. Opposite screen 321 is a lens 400 which concentrates light from the screen onto a photoelectric cell 401, and a filter 401a is placed between the screen and the lens, being designed to take out light rays constituting the "afterglow" from the screen. For instance, this filter may take out light below the green. The picture current output of cell 401 is taken to an amplifier 402, and the output of amplifier is shown as being taken by leads 403 and 404 to a second amplifier 405. A coil 406 is coupled to a coil 407 in the energizing circuit 365, 366 of lamp 327, and is itself energized by leads 408 and 409 connected across amplifier output leads 403 and 404. Thus there is provided a regenerative feed back circuit which causes intensification of the image on screen 321. The regeneratively reenforced picture current output of amplifier 405 is taken by leads 410 and 411 to a glow lamp 412, and the light from 412 is focussed by a lens 413 and reflected by a mirror 414 to strike a final viewing screen 415, which may be either a fluorescent screen, or a ground glass. Mirror 414 is deflected in two directions to cause the reflected beam to traverse the area of screen 415 by a double motion deflecting means 416 exactly like the deflecting means 334 which actuates mirror 330, and which is connected in parallel with said deflecting means 334, as indicated. Thus a regeneratively intensified image is available on secondary viewing screen 415.

The ultra violet light system thus accomplishes the same final purpose as does the cathode ray system of Fig. 1. It may also be noted that the system of Figs. 2 to 7 is not limited to use of ultra violet transmitter unit of Figs. 2 and 7 may be other refractive or reflective light capable of fluorescing a screen. It is further to be understood that the receiving unit as illustrated in Figs. 3 and 7 may be used as a receiver for the output of the cathode ray tube transmitter set of Fig. 1, this being accomplished by feeding the glow tube of Fig. 3 with the picture current output of amplifier 87 of Fig. 1, and operating the mirror system of Fig. 3 in synchronism with deflection of the beam of tube 10 of Fig. 1. Similarly, the ultra violet transmitter unit of Figs. 2 and 7 may be utilized to feed a cathode ray receiver tube of Fig. 1, as tube 30, this being accomplished by controlling the grid element 36 of tube 30 in accordance with the picture current output of amplifier 364 of Fig. 7, and operating the vibratory mirror 266 of the unit of Figs. 2 and 7 in synchronous relation with deflection of the beam of tube 30.

It is to be noted that the unit of Fig. 2 may in some cases be operated in an alternative manner. The casing member 250a carrying lens 356 and cell 357 is in this instance removed, exposing screen 252 to the direct view of the observer. Mirror 266 is stationary, and is so positioned that the optical axis of the light beam coming from objective 263 intersects the center of screen 262. Objective 263 is then so focussed that the entire area of screen 252 is at one time flooded with light from lamp 261, or is replaced with another objective designed to flood the screen with light, so that the entire screen area is caused to fluoresce at once. The image of the field is then cast on screen 252 in infra red rays, as before. The result is a quenching by the infra red image of a corresponding area of the uniformly fluorescing screen, again producing an image in differential values of fluorescent light. Such an image may be divided into picture elements by a scanning disk and transmitted to a remote station by such a system, for instance, as is diagrammatically indicated in Fig. 2a.

In Fig. 2a the fluorescent screen of Fig. 2 is designated at 252', the filter at 356a', and it will be understood an image in differential values of fluorescent light may be produced thereon in the manner described immediately above, or by utilizing a deflecting beam as described previously. The screen is viewed by a lens at 450, which forms a secondary image of the fluorescent light image on screen 252' to be scanned by scanning device 451. Light from the image passed through the scanning device is focussed by lens 453 on a photoelectric cell 454, the output leads of which are indicated as going to any transmitter, conventionally indicated at 455. Receiving systems designed to reproduce the image represented by the electrical picture current output of transmitter 455 are well known and need not here be described.

The illustrative embodiments of the invention as thus described are capable of "seeing" objects obscured as by darkness or fog, and rely typically upon reception of infra red rays coming from the objects of the field. In some instances, it is desirable to increase artificially the radiation or reflection of such infra red or other rays from the field to be observed. For example, assuming use of the system to enable airplanes to find landing fields in darkness or in fog, it is desirable to equip the field with infra-red ray generators or reflectors designed for intense infra red radiation. Such provision will of course greatly reduce the difficulty of the airplane pilot in finding the field.

Figure 9:
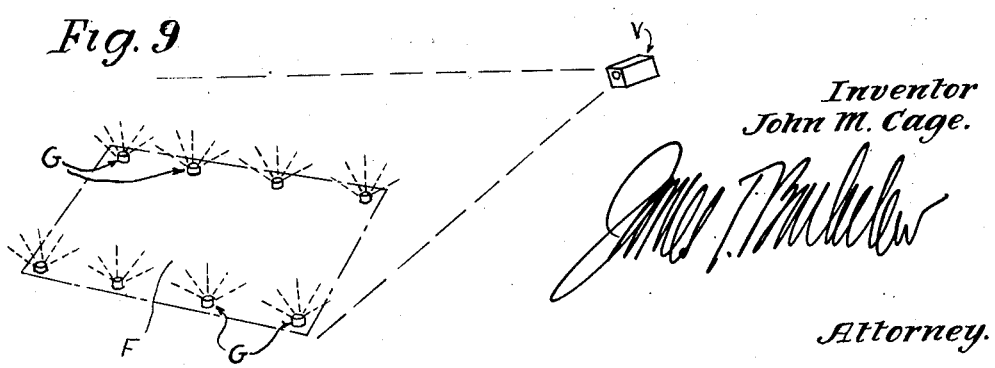
Fig. 9 diagrammatically illustrates the use of infra red generators outlining a field to be found or viewed in accordance with the present invention.

In many practical uses of the invention it will not be essential that minute detail of the objects of the field of view be brought up to clear visibility, and the formation on the viewing screen of a bare outline, or of a silhouette, of objects of the field may in such cases be sufficient. For example, in the situation of an airplane landing field, instanced just above, it is sufficient if the pilot is enabled to ascertain no more than the outline of the field. I illustrate in Fig. 9, for example, a landing field F, lined by diagrammatically indicated infra red ray generators G, of any known or suitable type, the vision apparatus of the present invention being generally designated at V, and being understood to be carried for instance by an airplane. It will be understood that the apparatus at V may consist, for example, of any of the previously described forms of the invention, or any apparatus within the scope of the present invention.

In the specification and in the claims I refer at times to control or variation of the intensity of the light spot on the screen, or of the intensity of the beam. It is to be understood that the intensity or brilliancy of a fluorescent spot of light caused by a cathode ray beam depends upon the number of electrons striking the screen per unit time, and also upon the voltage which accelerates the electrons, while in the case of violet or ultra violet light, the brilliancy of the spot may depend upon the wave length of that light, and upon the intensity of the source. When I refer generally to variation of the intensity of the cathode ray beam, or of whatever beam may be employed, I contemplate any manner by which that beam may be regulated to vary the brilliancy of the light spot on the screen, or its effect on the photo-cell.

It is to be understood that the methods, systems and instrumentalities hereinbefore described and illustrated are for illustrative purposes only, and that numerous modifications in design, arrangement and procedure may be made without departing from the spirit and scope of the following claims.

I claim:

1. The method of producing an image of a field in visible light, that comprises producing fluorescence of a screen by playing thereon a fluorescing beam, deflecting said beam in such manner as to sweep periodically over the area of said screen, whereby a traveling fluorescent light spot is formed on said screen, said screen being of a character to alter in fluorescence brilliancy under the influence of certain rays which do not in themselves have a fluorescing effect on the screen, forming an image of the field on the screen in such rays, whereby the brilliancy of the light spot varies with varying intensity of such image, producing an electric picture current which varies in accordance with varying brilliancy of the light spot, and utilizing the picture current to produce an intensified eye visual image of the field.

2. The method of producing an image of a field in visible light, that comprises forming an image of the field in infra red rays on a fluorescent screen which is of a nature to diminish in fluorescence under influence of infra red rays, playing an activating beam on said screen adapted to cause said screen to fluoresce, deflecting said beam in such manner as to sweep periodically over the area of said screen, whereby the brilliancy of the light spot formed by the beam on the screen varies with varying intensities of the infra red image traversed, producing an electric picture current which varies in accordance with the intensity of said light spot, amplifying said picture current, and utilizing the amplified picture current to produce an intensified visual image of the field.

3. The method of producing an image of a field in visible light, that comprises forming an image of the field in infra red rays on a fluorescent screen which is of a nature to diminish in fluorescence under influence of infra red rays, playing an activating beam on said screen adapted to cause said screen to fluoresce, deflecting said beam in such manner as to sweep periodically over the area of said screen, whereby the brilliancy of the light spot formed by the beam on the screen varies with varying intensities of the infra red image traversed, producing an electric picture current which varies in accordance with the intensity of said light spot, amplifying said picture current, producing fluorescence of a second fluorescent screen by playing thereon an activating beam, deflecting said last mentioned beam in such manner as to sweep periodically over the area of said screen in synchronous relation with deflection of the first mentioned beam, and controlling the intensity of the last mentioned beam in accordance with said amplified picture current.

4. The method of producing an image of a field in visible light, that comprises forming an image of the field in infra red rays on a fluorescent screen which is of a nature to diminish in fluorescence under influence of infra red rays, playing an activating beam on said screen adapted to cause said screen to fluoresce, deflecting said beam in such manner as to sweep periodically over the area of said screen, whereby the brilliancy of the light spot formed by the beam on the screen varies with varying intensities of the infra red image traversed, producing an electric picture current which varies in accordance with the intensity of said light spot, amplifying said picture current, playing a light beam on a second screen, deflecting said last mentioned beam in such manner as to sweep periodically over the area of said screen in synchronous relation with deflection of the first mentioned beam, and controlling the intensity of the last mentioned beam in accordance with said amplified picture current.

5. The method of producing an image in visible light of a field of view, that comprises forming an image of the field in infra red rays on a fluorescent screen which is of a nature to alter in fluorescence under the influence of infra red rays, playing an activating beam on said screen adapted to cause said screen to fluoresce, deflecting said beam in such manner as to sweep periodically over the area of said screen, whereby the brilliancy of the light spot formed by the beam on the screen varies with varying intensities of the infra red image traversed, producing an electric picture current which varies in accordance with the brilliancy of said light spot, and controlling the intensity of the activating beam in accordance with variations of the electric picture current, in such sense that the beam intensity is regeneratively increased by virtue of increase in brilliancy of the light spot, and is regeneratively decreased by virtue of decrease in brilliancy of the light spot.

6. The method of producing an image in visible light of a field of view, that comprises forming an image of the field in infra red rays on a fluorescent screen which is of a nature to diminish in fluorescence under the influence of infra red rays, playing an activating beam on said screen adapted to cause said screen to fluoresce, deflecting said beam in such manner as to sweep periodically over the area of said screen, whereby the brilliancy of the light spot formed by the beam on the screen varies inversely with varying intensities of the infra red image traversed, producing an electrical picture current which varies in accordance with the brilliancy of said light spot, and controlling the intensity of the activating beam in accordance with variations of the electric picture current, in such sense that the beam intensity is regeneratively increased by virtue of increase in brilliancy of the light spot, and is regeneratively decreased by virtue of decrease in brilliancy of the light spot.

7. The method of producing an image in visible light of a field of view, that comprises forming an image of the field in infra red rays on a fluorescent screen which is of a nature to diminish in fluorescence under the influence of infra red rays, playing an activating beam on said screen adapted to cause said screen to fluoresce, deflecting said beam in such manner as to sweep periodically over the area of said screen, whereby the brilliancy of the light spot formed by the beam on the screen varies inversely with varying intensities of the infra red image traversed, producing an electrical picture current which varies in accordance with the brilliancy of said light spot, controlling the intensity of the activating beam in accordance with variations of the electric picture current, in such sense that the beam intensity is regeneratively increased by virtue of increase in brilliancy of the light spot, and is regeneratively decreased by virtue of decrease in brilliancy of the light spot, producing an amplified picture current varying in accordance with regeneration reenforced brilliancy variations of the light spot, and utilizing said amplified picture current to produce an intensified visual image of the field.

8. The method of producing an image in visible light of a field of view, that comprises forming an image of the field in infra red rays on a fluorescent screen which is of a nature to alter in fluorescence under the influence of infra red rays, playing a cathode ray beam on said screen to cause it to fluoresce, deflecting said beam in such manner as to sweep periodically over the area of said screen, whereby the brilliancy of the light spot formed by the beam on the screen varies with varying intensities of the infra red image traversed, producing an electric picture current which varies in accordance with the brilliancy of said light spot, and utilizing said picture current to decrease the negative charge in a zone adjacent the source of the cathode ray beam in accordance with increase in brilliancy of the light spot, and to increase the negative charge in said zone in accordance with decrease in brilliancy of the light spot, whereby brilliancy variations of the light spot are regeneratively reenforced.

9. The method of producing an image in visible light of a field of view, that comprises forming an image of the field in infra red rays on a fluorescent screen which is of a nature to diminish in fluorescence under the influence of infra red rays, playing a cathode ray beam on said screen to cause it to fluoresce, deflecting said beam in such manner as to sweep periodically over the area of said screen, whereby the brilliancy of the light spot formed by the beam on the screen varies inversely with varying intensities of the infra red image traversed, producing an electrical picture current which varies in accordance with the brilliancy of said light spot, and utilizing said picture current to decrease the negative charge in a zone adjacent the source of the cathode ray beam in accordance with increase in brilliancy of the light spot, and to increase the negative charge in said zone in accordance with decrease in brilliancy of the light spot, whereby brilliancy variations of the light spot are regeneratively reenforced.

10. The method of producing an image in visible light of a field of view, that comprises forming an image of the field in infra red rays on a fluorescent screen which is of a nature to diminish in fluorescence under the influence of infra red rays, playing a cathode ray beam on said screen to cause it to fluoresce, deflecting said beam in such manner as to sweep periodically over the area of said screen, whereby the brilliancy of the light spot formed by the beam on the screen varies inversely with varying intensities of the infra red image traversed, producing an electrical picture current which varies in accordance with the brilliancy of said light spot, and utilizing said picture current to decrease the negative space charge in a zone adjacent the source of the cathode ray beam in accordance with increase in brilliancy of the light spot, and to increase the negative space charge in said zone in accordance with decrease in brilliancy of the light spot, whereby brilliancy variations of the light spot are regeneratively reenforced, producing an amplified picture current varying in accordance with regeneration reenforced brilliancy variations of the light spot, producing fluorescence of a second fluorescent screen by playing thereon a cathode ray beam, deflecting the last mentioned cathode ray beam in such manner as to sweep periodically over the area of the first mentioned cathode ray beam, and controlling the intensity of the last mentioned cathode ray beam in accordance with said amplified picture current.

11. In an invisible ray vision system, the combination of a fluorescent screen adapted to fluoresce under the influence of a beam of activating rays of a given character, and adapted to be repressed in fluorescence brilliancy under the added influence of infra red rays, optical means for forming an image on said screen of the subject to be viewed in infra red rays, means for directing a focussed beam of the activating rays on the screen, whereby a relatively small spot of fluorescent light is formed on the screen, of brilliancy dependent upon the incidence of infra red rays on the screen area covered by the spot, means for continuously deflecting said beam in such manner as to cause the light spot to sweep periodically over the image area of the screen, whereby the brilliancy of the light spot varies with characteristics of the infra red image traversed, means for producing an electrical picture current which varies in accordance with the changing brilliance of said light spot, means for amplifying said picture current, and means controlled by said amplified picture current and synchronized with said beam deflecting means for producing a visual image of the field.

12. In an invisible ray vision system, the combination of a fluorescent screen adapted to fluoresce under the influence of a beam of activating rays of a given character, and adapted to be repressed in fluorescence brilliancy under the added influence of infra red rays, optical means for forming an image on said screen of the subject to be viewed in infra red rays, means for directing a focussed beam of the activating rays on the screen, whereby a relatively small spot of fluorescent light is formed on the screen, of brilliancy dependent upon the incidence of infra red rays on the screen area covered by the spot, means for continuously deflecting said beam in such manner as to cause the light spot to sweep periodically over the image area of the screen, whereby the brilliancy of the light spot varies with characteristics of the infra red image traversed, means for producing an electrical picture current which varies in accordance with the changing brilliance of said light spot, means for amplifying said picture current, a second screen, means for directing a focussed beam of light to form a relatively small light spot on said second screen, means for deflecting said beam in such a manner as to cause said light spot to sweep periodically over the screen in synchronous relation with deflection of the first mentioned beam, and means for controlling the intensity of the last mentioned beam in accordance with said amplified picture current.

13. In combination, a cathode ray tube having a fluorescent screen formed of a substance which diminishes in fluorescence brilliancy under the added influence of infra red rays, said tube having deflecting means causing its cathode ray to traverse the area of the screen, optical means associated with the tube for forming an image in infra red rays on said fluorescent screen, photoelectric means for producing an electric picture current which varies in accordance with changing brilliance of the fluorescent screen, an amplifier for amplifying said picture current, a second cathode ray tube, means applying said amplified picture current to said second cathode ray tube in such manner as to control the intensity of its cathode ray, said second tube having ray deflecting means adapted to cause its cathode ray to traverse the area of its screen, and means synchronously energizing the ray deflecting means of the two tubes, whereby the two ray beams move in synchronism.

14. In combination, a screen adapted to fluoresce under the influence of a beam of activating rays and to alter in fluorescence brilliancy with the addition of infra red rays, means for forming a beam of activating rays and directing it onto said screen, means for deflecting said beam to traverse the area of the screen, means for forming an infra red ray image on said screen, whereby the moving fluorescent light spot produced by the activating beam on the screen varies in brilliancy with intensity variations of the infra red image, photoelectric means adapted to produce an electric current varying in accordance with variations in the brilliancy of said light spot, and means for controlling the intensity of the beam of activating rays in accordance with variations in said electric current.

15. In combination, a screen adapted to fluoresce under the influence of a beam of activating rays and to diminish in fluorescence brilliancy with the addition of infra red rays, means for forming a beam of activating rays and directing it onto said screen, means for deflecting said beam to traverse the area of the screen, means for forming an infra red ray image on said screen, whereby the moving fluorescent light spot produced by the activating beam on the screen diminishes in brilliancy with increase in intensity of the infra red ray image, photoelectric means adapted to produce an electric picture current varying in accordance with changes in brilliancy of the light spot, and means for controlling the intensity of the beam of activating rays in accordance with variations of the electric picture current.

16. In combination, a cathode ray tube having a cathode, a cathode ray control element, a fluorescent screen adapted to fluoresce when struck by a cathode ray beam coming from said cathode, said screen being of a character to alter in fluorescence brilliancy under influence of infra red rays, means for casting an infra red ray image on said screen, deflecting means for causing the cathode ray beam to traverse the area of said screen, photoelectric means for producing an electric current varying with variations in brilliancy of screen fluorescence, and means for varying the intensity of said cathode ray beam in accordance with variations in said electric current.

17. In an invisible ray vision system, the combination of a fluorescent screen adapted to fluoresce under the influence of a beam of activating rays of a given character, and adapted to alter in fluorescence brilliancy under the added influence of rays of a second character, optical means for forming an image on said screen in rays of the last mentioned character, means for directing a focussed beam of the activating rays on the screen, whereby a relatively small spot of fluorescent light is formed on the screen, of brilliancy dependent upon the incidence of rays of the second character on the screen area covered by the spot, means for continuously deflecting said beam in such manner as to cause the light spot to sweep periodically over the image area of the screen, whereby the brilliancy of the light spot varies as it traverses different intensity portions of the image formed in rays of the second character, means for producing an electrical picture current which varies in accordance with the changing brilliance of said light spot, means for amplifying said picture current, a second screen, means for directing a focussed beam of light to form a relatively small light spot on said second screen, means for deflecting said beam in such a manner as to cause said light spot to sweep periodically over the screen in synchronous relation with reflection of the first mentioned beam, means for controlling the intensity of the last mentioned beam in accordance with said amplified picture current, whereby the light spot moving over said screen varies in brilliancy in accordance with the picture current, photoelectric means adapted to produce another electric picture current varying in accordance with changes in brilliancy of said last mentioned light spot, and means for regeneratively reenforcing intensity variations of the light beam focussed on said second screen in accordance with variations in said last mentioned picture current.

18. In an invisible ray vision system, the combination of a fluorescent screen adapted to fluoresce under the influence of a beam of activating rays of a given character, and adapted to alter in fluorescence brilliancy under the added influence of rays of a second character, optical means for forming an image on said screen in rays of the last mentioned character, means for directing a focussed beam of the activating rays on the screen, whereby a relatively small spot of fluorescent light is formed on the screen, of brilliancy dependent upon the incidence of rays of the second character on the screen area covered by the spot, means continuously deflecting said beam in such manner as to cause the light spot to sweep periodically over the image area of the screen, whereby the brilliancy of the light spot varies as it traverses different intensity portions of the image formed in rays of the second character, means for producing an electrical picture current which varies in accordance with the changing brilliance of said light spot, means for amplifying said picture current, a second screen, means for deflecting a focussed beam of light to form a relatively small light spot on said second screen, means for deflecting said beam in such a manner as to cause said light spot to sweep periodically over the screen in synchronous relation with reflection of the first mentioned beam, means for controlling the intensity of the last mentioned beam in accordance with said amplified picture current, whereby the light spot moving over said screen varies in brilliancy in accordance with the picture current, photoelectric means adapted to produce another electric picture current varying in accordance with changes in brilliancy of said last mentioned light spot, means for regeneratively reenforcing intensity variations of the light beam focussed on said second screen in accordance with variations in said last mentioned picture current, a third screen, means for directing a focussed beam of light to form a relatively small light spot on said third screen, means for deflecting said beam in such manner as to cause said light spot to sweep periodically over the screen in synchronous relation with deflection of the first and second beams, and means for controlling the intensity of the third beam in accordance with variations of the last mentioned picture current.

19. In an invisible ray vision system, the combination of a fluorescent screen adapted to fluoresce under the influence of a beam of activating rays of a given character, and adapted to be repressed in fluorescence brilliancy under the added influence of infra red rays, photoelectric means adapted to be light affected by fluorescent light from said screen, said photoelectric means being substantially unaffected by infra red rays, optical means for forming an image on said screen of the subject to be viewed in infra red rays, means for directing a focussed beam of the activating rays on the screen, whereby a relatively small spot of fluorescent light is formed on the screen, of brilliancy dependent upon the incidence of infra red rays on the screen area covered by the spot, and means for continuously deflecting said beam in such manner as to cause the light spot to sweep periodically over the image area of the screen, whereby the brilliancy of the light spot varies with characteristics of the infra red image traversed, said photoelectric means producing an electrical picture current which varies in accordance with the changing brilliance of the moving light spot.

20. In a system of the character described, the combination of a fluorescent screen, photoelectric means adapted to be light affected by fluorescent light from said screen, said fluorescent screen being adapted to fluoresce under the influence of a beam of activating rays of a given character, and adapted to be repressed in fluorescence under the added influence of certain rays to which the photoelectric means is substantially insensitive, optical means for forming on said screen an image of a subject to be viewed in rays of the last mentioned kind, means for directing a focussed beam of the fluorescence activating rays on the screen, whereby a relatively small spot of fluorescent light is formed on the screen, of brilliancy dependent upon the incidence of fluorescence repressing rays on the screen area covered by the spot, and means for continuously deflecting said beam in such manner as to cause the light spot to sweep periodically over the image area of the screen, whereby the brilliancy of the light spot varies with characteristics of the fluorescence repressing image traversed, said photoelectric means producing an electrical picture current which varies in accordance with the changing brilliance of the light spot.

21. The method of producing a fluorescent light image of an object or field of view, that comprises subjecting a fluorescent screen to the influence of two beams of radiant energy, one a locally generated beam of activating rays adapted to cause the screen to fluoresce, focused to throw a spot on the screen, and deflected to sweep periodically over the area of the screen, and the second comprising a beam of rays antagonistic to fluorescence coming from the object or field of view, and forming the second beam to cast an optical image of said object or field of view on the fluorescent screen, whereby the line of fluorescent light traced by the deflected activating ray beam is modulated in intensity in accordance with the intensities of elemental areas of the antagonizing ray image traversed by the focused activating beam.

22. In an image forming system, the combination of a fluorescent screen adapted to fluoresce under the influence of a beam of activating rays of a given character, and to be repressed in fluorescence by certain antagonizing rays, a local source of said activating rays, means for focusing and directing said activating rays to form a concentrated beam impinging on the screen to form a fluorescent light spot thereon, means for continuously deflecting said beam to cause said light spot to sweep periodically over the image area of said screen, and optical means for forming on said screen an optical image of a subject to be viewed in said antagonizing rays, whereby the fluorescent line of light traced by the activating ray beam is modulated in intensity in accordance with the intensities of elemental areas of the antagonizing ray image traversed by said focused activating ray beam.

23. In a system of the character described, the combination of a fluorescent screen, photoelectric means adapted to be light affected by fluorescent light from said screen, said fluorescent screen being adapted to fluoresce under the influence of a beam of activating rays of a given character, and adapted to be modified in fluorescence under the added influence of certain rays to which the photoelectric means is substantially insensitive, optical means for forming on said screen an image of a subject to be viewed in rays of the last mentioned kind, means for directing a focused beam of the fluorescence activating rays on the screen, whereby a relatively small spot of fluorescent light is formed on the screen, of brilliancy dependent upon the incidence of fluorescence modifying rays on the screen area covered by the spot, and means for continuously deflecting said beam in such manner as to cause the light spot to sweep periodically over the image area of the screen, whereby the brilliancy of the light spot varies with characteristics of the fluorescence modifying image traversed, said photoelectric means producing an electrical picture current which varies in accordance with the changing brilliancy of the light spot.

24. In combination, a cathode ray tube having a fluorescent screen which is repressed in fluorescence under the influence of certain fluorescence quenching rays, said tube having deflecting means causing its cathode ray beam to traverse the image area of said screen, and optical means associated with said cathode ray tube for forming an optical quenching-ray image of a subject to be viewed on the image area of said fluorescent screen being traversed by said cathode beam, in such manner that the line of fluorescent light traced by said cathode beam is modulated in intensity as it traverses said quenching ray image, so as to produce an image of the subject in differential values of fluorescent light.

25. The method of producing a fluorescent light image of a field of view, that comprises forming an image of the field on a fluorescent screen in rays which are of a nature of repress fluorescence of said screen, playing an activating beam on said screen adapted to cause said screen to fluoresce, deflecting said beam in such manner as to sweep periodically over the area of said screen, whereby the brilliancy of the light spot formed by the beam on the screen varies with varying intensities of the repressing ray image traversed, and producing an electric picture current which varies in accordance with the intensity of said light spot.

26. The method of producing a fluorescent light image of a field of view, that comprises forming an image of the field on a fluorescent screen in rays which are of a nature to repress fluorescence of said screen, playing an activating beam on said screen adapted to cause said screen to fluoresce, deflecting said beam in such manner as to sweep periodically over the area of said screen, whereby the brilliancy of the light spot formed by the beam on the screen varies with varying intensities of the repressing ray image traversed, producing an electric picture current which varies in accordance with the intensity of said light spot, and controlling the intensity of the activating beam in accordance with variations of the electric picture current, in such sense that the beam intensity is regeneratively increased by virtue of increase in brilliancy of the light spot, and is regeneratively decreased by virture of decrease in brilliancy of the light spot.

27. In combination, a screen adapted to fluoresce under the influence of a beam of activating rays and to diminish in fluorescence brilliancy with the addition of certain fluorescence repressing rays, means for forming a beam of activating rays and directing it onto said screen, means for deflecting said beam to traverse the area of the screen, means for forming on the screen an image of a subject or field of view in said fluorescence repressing rays, whereby the moving fluorescent light spot produced on the screen by the activating beam diminishes in brilliancy with increase in intensity of the repressing ray image, photoelectric means adapted to produce an electric picture current varying in accordance with changes in brilliancy of the light spot, and means for controlling the intensity of the beam of activating rays in accordance with variations of the electric picture current.

28. In combination, a cathode ray tube having a cathode, a cathode ray control element, a fluorescent screen adapted to fluoresce when struck by a cathode ray beam coming from said cathode, said screen being of a character to be repressed in fluorescence brilliancy under influence of certain fluorescence repressing rays, means for casting an image of a subject or field of view on said screen in said fluorescence repressing rays, deflecting means for causing the cathode ray beam to traverse the area of said screen, photoelectric means for producing an electric current varying with variations in brilliancy of screen fluorescence, and means for varying the intensity of said cathode ray beam in accordance with variations in said electric current.

29. An image transmitting system comprising a photo-reactive plate which is activated to produce a reaction by radiations of one kind and whose reactive intensity is repressed by radiations of another kind, means for casting an optical image on said plate in radiations of one of said kinds, means for casting radiations of the other of said kinds on said plate, means forming the radiations of one of said kinds into a restricted beam of elemental cross-sectional area, means for scanning the image on said plate with said restricted beam, and means responsive to the resultant varying reaction of said plate for successively developing signal currents proportionate to the tone of points of said image as said image is scanned.

30. An image transmitting system comprising a photo-reactive plate which is activated to produce an emanation by radiations of one kind and whose emanative activity is repressed by radiations of another kind, means for casting an optical image on said plate in radiations of one of said kinds, means for casting radiations of the other of said kinds on said plate, means forming the radiations of one of said kinds into a restricted beam of elemental cross-sectional area, means for scanning the image on said plate with said restricted beam, and means responsive to the resultant varying emanation from said plate for successively developing signal currents proportionate to the tone of points of said image as said image is scanned.

31. An image transmitting system comprising a photo-reactive plate which is activated to produce an emanation by radiations of one kind and whose emanative activity is repressed by radiations of another kind, means for directing a restricted beam of elemental cross-sectional area on said plate in radiations of the first mentioned kind, means for casting an optical image on said plate in radiations of the second mentioned kind, means for scanning the image on said plate with said restricted beam, and means responsive to the resultant varying emanation from said plate for successively developing signal currents proportionate to the tones of points of said image as said image is scanned.

32. An image transmitting system comprising a photo-reactive plate which is activated to produce an emanation by radiations of one kind and whose emanative activity is modified by intra-red radiations, means for casting an optical image on said plate in one of said kinds of radiations, means for directing a restricted beam of elemental cross-sectional area on said plate in radiations of the other kind, means for scanning the image with said restricted beam, and means responsive to the resultant varying emanation from said plate for successively developing signal currents proportionate to the tones of points of said image as said image is scanned.

33. An image transmitting system comprising a photo-reactive plate which is activated to produce an emanation by radiations of one kind and whose emanative activity is modified by infra-red radiations, means for casting an optical image on said plate in infra-red radiations, means for directing a restricted beam of elemental cross-sectional area on said plate in radiations of the first mentioned kind, means for scanning the image with said restricted beam, and means responsive to the resultant varying emanation from said plate for successively developing signal currents proportionate to the tones of points of said image as said image is scanned.

34. An image transmitting system comprising a fluorescent screen, means for casting an optical image on said plate in radiations of one kind, means for directing a restricted beam of elemental cross-sectional area on said plate in radiations of another kind, one of said kinds of radiations being of a nature to cause fluorescence of said screen, and the other of said kinds of radiations being infra-red, means for scanning the image on said plate with said restricted beam, and means responsive to the resultant fluorescent light emanating from said screen for successively developing signal currents proportionate to the tone of points of said image as said image is scanned.

35. An image transmitting system comprising a photo-reactive plate which is activated to produce an emanation by radiations of one kind and whose emanative activity is repressed by radiations of another kind, means for casting an optical image on said plate in radiations of one of said kinds, means for casting radiations of the other of said kinds on said plate, means for scanning the image on the plate, and means acting in cooperation with the scanning means to successively develop signal currents proportionate to the tone of points of the image as the image is scanned.

36. An image transmitting system comprising a fluorescent screen, means for irradiating said screen with fluorescence inducing rays, and means for casting an image on said screen in radiant energy of relatively long wave length, whereby an image is formed on said screen in differential values of fluorescent light, means for scanning said image on said fluorescent screen, and means acting in cooperation with the scanning means to successively develop signal currents proportionate to the tone of points of the image as the image is scanned.

37. An image transmitting system comprising a fluorescent screen, means for inducing fluorescence of said screen, and means for casting an image on said screen in radiant energy of relatively long wave length, whereby an image is formed on said screen in differential values of fluorescent light, means for scanning said image on said fluorescent screen, and photo-electric means relatively sensitive to fluorescent light but relatively unaffected by the relatively long wave length image-forming radiant energy acting in cooperation with the scanning means to successively develop signal currents proportionate to the fluorescent tone of points of the image as the image is scanned.

38. An image transmitting system comprising a photo-reactive plate of a type substantially unaffected when subjected to radiations only of relatively long wave length but affected by radiations of another kind to produce a reaction capable of being modified in intensity by the superimposition of relatively long wave length radiations, means for casting an optical image on said plate in such relatively long wave length radiations, means for scanning the plate point-by-point by a moving spot of radiations of said other kind, and means responsive to the resulting varying reaction of said plate for successively developing signal currents proportionate to the tone of points of said image as said image is scanned.

39. The method of producing on a fluorescent screen a continuing light image of a field of view so that at each instant only the image reaching the screen at that instant will be present on the screen in spite of movement relative to each other of the screen and field or portions thereof, that comprises maintaining a continuing irradiation of a fluorescent screen with fluorescence activating rays, and casting successively on different portions of said irradiated screen during its continuing irradiation an optical image of the field of view in rays of relatively long wave length radiant energy received from the field of view, whereby portions of the screen are activated to fluorescence by the activating rays and modified in fluorescence brilliancy in accordance with the local intensities of corresponding portions of said relatively long wave length radiant energy image and other portions of the screen which have been previously modified by the image are restored by the activating rays.

40. The method of producing on a fluorescent screen a continuing light image of a field of view so that at each instant only the image reaching the screen at that instant will be present on the screen in spite of movement relative to each other of the screen and field or portions thereof, that comprises maintaining a continuing activation of a fluorescent screen and casting successively on different portions of said activated screen during its continuing activation an optical image of the field of view in rays of relatively long wave length radiant energy received from the field of view, whereby portions of the screen are activated to fluorescence by the activating rays and modified in fluorescence brilliancy in accordance with the local intensities of corresponding portions of said relatively long wave length radiant energy image and other portions of the screen which have been previously modified by the image are restored by the continuing activation of said screen.

JOHN M. CAGE.